US009058500B2

(12) United States Patent
Wu et al.

(10) Patent No.: US 9,058,500 B2
(45) Date of Patent: Jun. 16, 2015

(54) METHOD AND APPARATUS FOR INPUTTING DATA

(71) Applicant: Huawei Technologies Co., Ltd., Shenzhen, Guangdong (CN)

(72) Inventors: Xiaoxin Wu, Beijing (CN); Bin Tu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/294,700

(22) Filed: Jun. 3, 2014

(65) Prior Publication Data

US 2014/0359273 A1 Dec. 4, 2014

(30) Foreign Application Priority Data

Jun. 3, 2013 (CN) .......................... 2013 1 0216048

(51) Int. Cl.
*G06F 21/60* (2013.01)
*H04L 29/06* (2006.01)
*G06F 9/455* (2006.01)
*G06F 21/83* (2013.01)

(52) U.S. Cl.
CPC .......... *G06F 21/606* (2013.01); *H04L 63/0428* (2013.01); *G06F 9/455* (2013.01); *G06F 21/83* (2013.01); *G06F 21/602* (2013.01); *G06F 2221/031* (2013.01); *G06F 9/45533* (2013.01); *G06F 2221/2105* (2013.01)

(58) Field of Classification Search
None
See application file for complete search history.

(56) References Cited

U.S. PATENT DOCUMENTS

| 8,656,482 | B1 * | 2/2014 | Tosa et al. ........................ 726/15 |
| 2007/0300292 | A1 * | 12/2007 | Scipioni et al. .................... 726/5 |

(Continued)

FOREIGN PATENT DOCUMENTS

| CN | 101136045 A | * | 3/2008 |
| CN | 101414913 A | | 4/2009 |
| CN | 101976317 A | | 2/2011 |

(Continued)

OTHER PUBLICATIONS

CN 101136045 A machine translation.*

(Continued)

*Primary Examiner* — Aravind Moorthy
*Assistant Examiner* — Jason Plotkin

(57) ABSTRACT

Embodiments of the present invention provide a method and an apparatus for inputting data. The present invention relates to the communications field and aims to improve security of input information. The method includes: acquiring, by a virtual machine manager, input data; performing, by the virtual machine manager, encryption processing on the input data according to an encryption rule of a security connection to obtain encrypted data, where the security connection refers to a connection that is established between an application interface and a server and used for data transmission; and sending, by the virtual machine manager, the encrypted data to the server. The present invention is applicable to a data input scenario.

17 Claims, 8 Drawing Sheets

(56) References Cited

U.S. PATENT DOCUMENTS

| | | |
|---|---|---|
| 2008/0028441 A1* | 1/2008 | Novoa et al. .................. 726/4 |
| 2008/0109804 A1* | 5/2008 | Bloomstein et al. ............ 718/1 |
| 2010/0146267 A1* | 6/2010 | Konetski et al. ............. 713/164 |
| 2011/0141124 A1 | 6/2011 | Halls et al. |
| 2012/0079282 A1* | 3/2012 | Lowenstein et al. .......... 713/189 |
| 2013/0073849 A1 | 3/2013 | Wang |
| 2013/0290694 A1* | 10/2013 | Civilini et al. ................ 713/2 |
| 2013/0346903 A1* | 12/2013 | Puppin ......................... 715/773 |
| 2014/0373012 A1* | 12/2014 | Ylitalo et al. .................. 718/1 |

FOREIGN PATENT DOCUMENTS

| | | |
|---|---|---|
| CN | 102195940 A | 9/2011 |
| CN | 102521531 A | 6/2012 |

OTHER PUBLICATIONS

CN 101136045 A partial translation.*
Jian-kun Ma, et al., "Anti-key Logger Based on Hardware-assisted Virtualization", Computer Science, vol. 38, No. 11, Nov. 2011, 5 pages.

* cited by examiner

METHOD AND APPARATUS FOR INPUTTING DATA

CROSS-REFERENCE TO RELATED APPLICATION

This application claims priority to Chinese Patent Application No. 201310216048.1, filed on Jun. 3, 2013, which is hereby incorporated by reference in its entirety.

TECHNICAL FIELD

The present invention relates to the communications field, and in particular, to a method and an apparatus for inputting data.

BACKGROUND

A virtual machine manager (Virtual Machine Monitor/Manager, virtual machine manager) is a software layer, which can run directly on a hardware layer and manage a plurality of operating systems that share hardware resources. When a server starts and executes the virtual machine manager, the virtual machine manager can create a plurality of virtual machines and allocate an appropriate number of hardware resources, such as memory, CPUs, and disks, to each virtual machine.

The virtual machine manager manages a plurality of virtual machines, and an independent operating system and independent middleware run on each of the virtual machines. On this basis, various applications can be run on different virtual machines as required and isolated from other applications. In this way, during implementation of secure input, security protection can be performed only for an application that requires secure input or an operating system that runs the application.

The prior art has the following disadvantages: Because the operating system performs corresponding security and encryption processing during the security protection, plaintext input by a user may be acquired if the operating system is attacked, thereby reducing security of input information.

SUMMARY

Embodiments of the present invention provide a method and an apparatus for inputting data, to improve security of input information.

To achieve the foregoing objective, the embodiments of the present invention adopt the following technical solutions:

According to a first aspect, an embodiment of the present invention provides a method for inputting data, including: acquiring, by a virtual machine manager, input data; performing, by the virtual machine manager, encryption processing on the input data according to an encryption rule of a security connection to obtain encrypted data, where the security connection refers to a connection that is established between an application interface and a server and used for data transmission; and sending, by the virtual machine manager, the encrypted data to the server.

In a first possible implementation manner of the first aspect, the acquiring, by a virtual machine manager, input data includes: acquiring, by the virtual machine manager, the input data by using a virtual input unit, where the virtual input unit implements a same function as a physical input unit.

With reference to the first possible implementation manner of the first aspect, in a second possible implementation manner of the first aspect, the method further includes: creating the virtual input unit by using a virtual input unit interface provided by an operating system.

With reference to the first or the second possible implementation manner of the first aspect, in a third possible implementation manner of the first aspect, the virtual input unit includes a first normal zone and a first security zone; the first normal zone is used to acquire second input data that requires no encryption processing; and the first security zone is used to acquire first input data that requires security processing; the acquiring, by the virtual machine manager, the input data by using a virtual input unit includes: acquiring, by the virtual machine manager, the first input data via the first security zone; and acquiring the second input data via the first normal zone; and the performing, by the virtual machine manager, encryption processing on the input data according to an encryption rule of a security connection to obtain encrypted data includes: performing, by the virtual machine manager, encryption processing on the first input data according to the encryption rule of the security connection to obtain the encrypted data.

With reference to any one of the first to the third possible implementation manners of the first aspect, in a fourth possible implementation manner of the first aspect, the virtual input unit includes: a virtual keyboard.

With reference to the first aspect, in a fifth possible implementation manner of the first aspect, the acquiring, by a virtual machine manager, input data includes: controlling, by the virtual machine manager, a physical input unit; and acquiring, by the virtual machine manager, the input data by using the physical input unit, where the input data is buffered in an input buffer; and after the acquiring, by the virtual machine manager, the input data by using the physical input unit, the method further includes: clearing, by the virtual machine manager, the input buffer.

With reference to the fifth possible implementation manner of the first aspect, in a sixth possible implementation manner of the first aspect, the physical input unit includes a second security zone and a second normal zone; the second normal zone is used to acquire fourth input data that requires no security processing; the second security zone is used to acquire third input data that requires security processing; the acquiring, by the virtual machine manager, the input data by using the physical input unit includes: acquiring, by the virtual machine manager, the third input data via the second security zone; and acquiring the fourth input data via the second normal zone; and the performing, by the virtual machine manager, encryption processing on the input data according to an encryption rule of a security connection to obtain encrypted data includes: performing, by the virtual machine manager, encryption processing on the third input data according to the encryption rule of the security connection to obtain the encrypted data.

With reference to the fifth or the sixth possible implementation manner of the first aspect, in a seventh possible implementation manner of the first aspect, the physical input unit includes: a physical keyboard.

With reference to the first aspect or any one of the first to the seventh possible implementation manners of the first aspect, in an eighth possible implementation manner, after the acquiring, by a virtual machine manager, input data, the method further includes: generating, by the virtual machine manager, forged input data, and sending the forged input data to the operating system.

With reference to the first aspect or any one of the first to the eighth possible implementation manners of the first aspect, in a ninth possible implementation manner of the first aspect, before the performing, by the virtual machine manager, encryption processing on the input data according to an encryption rule of a security connection to obtain encrypted data, the method further includes: receiving, by the virtual machine manager, a submission instruction, where the submission instruction is an instruction that is used to instruct a user to complete data input; and the performing, by the virtual machine manager, encryption processing on the input data according to an encryption rule of a security connection to obtain encrypted data includes: performing, by the virtual machine manager, encryption processing on the input data according to the encryption rule of the security connection to obtain the encrypted data after receiving the submission instruction.

With reference to the first aspect or any one of the first to the ninth possible implementation manners of the first aspect, in a tenth possible implementation manner of the first aspect, before the acquiring, by a virtual machine manager, input data, the method further includes: receiving, by the virtual machine manager, a trigger instruction, where the trigger instruction is an instruction that is used to trigger the virtual machine manager to enable data encryption; and the performing, by the virtual machine manager, encryption processing on the input data according to an encryption rule of a security connection to obtain encrypted data includes: performing, by the virtual machine manager and in response to the trigger instruction, encryption processing on the input data according to the encryption rule of the security connection to obtain the encrypted data.

With reference to the first aspect or any one of the first to the tenth possible implementation manners of the first aspect, in an eleventh possible implementation manner of the first aspect, the sending, by the virtual machine manager, the encrypted data to the server includes: sending, by the virtual machine manager, the encrypted data to the server over the security connection by using the application interface.

With reference to the first aspect or any one of the first to the eleventh possible implementation manners of the first aspect, in a twelfth possible implementation manner of the first aspect, the security connection includes: a Secure Sockets Layer SSL connection; and the performing, by the virtual machine manager, encryption processing on the input data according to an encryption rule of a security connection to obtain encrypted data includes: performing, by the virtual machine manager, encryption processing on the input data according to an encryption rule of the SSL connection to obtain the encrypted data.

According to a second aspect, an embodiment of the present invention provides a virtual machine manager, including: an acquiring unit, configured to acquire input data; a processing unit, configured to perform, according to an encryption rule of a security connection, encryption processing on the input data acquired by the acquiring unit, so as to obtain encrypted data, where the security connection refers to a connection that is established between an application interface and a server and used for data transmission; and a transceiver unit, configured to send the encrypted data to the server.

In a first possible implementation manner of the second aspect, the acquiring unit is specifically configured to acquire the input data by using a virtual input unit, where the virtual input unit implements a same function as a physical input unit.

With reference to the first possible implementation manner of the second aspect, in a second possible implementation manner of the second aspect, the virtual machine manager further includes: a creating unit, configured to create the virtual input unit by using a virtual input unit interface provided by an operating system.

With reference to the first or the second possible implementation manner of the second aspect, in a third possible implementation manner of the second aspect, the virtual input unit includes a first normal zone and a first security zone; the first normal zone is used to acquire second input data that requires no encryption processing; and the first security zone is used to acquire first input data that requires security processing; the acquiring unit is specifically configured to acquire the first input data via the first security zone, and acquire the second input data via the first normal zone; and the processing unit is specifically configured to perform, according to the encryption rule of the security connection, encryption processing on the first input data acquired by the acquiring unit, so as to obtain the encrypted data.

With reference to the second aspect, in a fourth possible implementation manner of the second aspect, the acquiring unit is specifically configured to control a physical input unit and acquire the input data by using the physical input unit, where the input data is buffered in an input buffer; and the processing unit is further configured to clear the input buffer.

With reference to the fourth possible implementation manner of the second aspect, in a fifth possible implementation manner of the second aspect, the physical input unit includes a second security zone and a second normal zone; the second normal zone is used to acquire fourth input data that requires no security processing; the second security zone is used to acquire third input data that requires security processing; the acquiring unit is specifically configured to acquire the third input data via the second security zone, and acquire the fourth input data via the second normal zone; and the processing unit is specifically configured to perform, according to the encryption rule of the security connection, encryption processing on the third input data acquired by the acquiring unit, so as to obtain the encrypted data.

With reference to the second aspect or any one of the first to the fifth possible implementation manners of the second aspect, in a sixth possible implementation manner of the second aspect, the processing unit is further configured to generate forged input data and send the forged input data to the operating system.

With reference to the second aspect or any one of the first to the sixth possible implementation manners of the second aspect, in a seventh possible implementation manner of the second aspect, the transceiver unit is further configured to receive a submission instruction, where the submission instruction is an instruction that is used to instruct a user to complete data input; and the processing unit is specifically configured to perform, after the transceiver unit receives the submission instruction, encryption processing on the input data according to the encryption rule of the security connection to obtain the encrypted data.

With reference to the second aspect or any one of the first to the seventh possible implementation manners of the second aspect, in an eighth possible implementation manner of the second aspect, the transceiver unit is further configured to receive a trigger instruction, where the trigger instruction is an instruction that is used to trigger the virtual machine manager to enable data encryption; and the processing unit is specifically configured to respond to the trigger instruction received by the transceiver unit, and perform encryption processing on the input data according to the encryption rule of the security connection to obtain the encrypted data.

With reference to the second aspect or any one of the first to the eighth possible implementation manner of the second aspect, in a ninth possible implementation manner of the second aspect, the transceiver unit is specifically configured to send the encrypted data to the server over the security connection by using the application interface.

With reference to the second aspect or any one of the first to the ninth possible implementation manners of the second aspect, in a tenth possible implementation manner of the second aspect, the security connection includes: a Secure Sockets Layer SSL connection; and the processing unit is specifically configured to perform encryption processing on the input data according to an encryption rule of the SSL connection to obtain the encrypted data.

According to a third aspect, an embodiment of the present invention provides a physical host, where the physical host includes: a hardware layer, a virtual machine manager VMM running on the hardware layer, and at least one virtual machine running on the virtual machine manager VMM, where the virtual machine manager is the virtual machine manager described in the foregoing embodiment.

The embodiments of the present invention provide a method and an apparatus for inputting data. After acquiring input data, a virtual machine manager performs encryption processing on the input data according to an encryption rule of a security connection to obtain encrypted data, and sends the encrypted data to a server. In this way, encryption processing can be performed for the data input by a user on the virtual machine manager to obtain the encrypted data, and the encrypted data is then sent to the server. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DETAILED DESCRIPTION

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
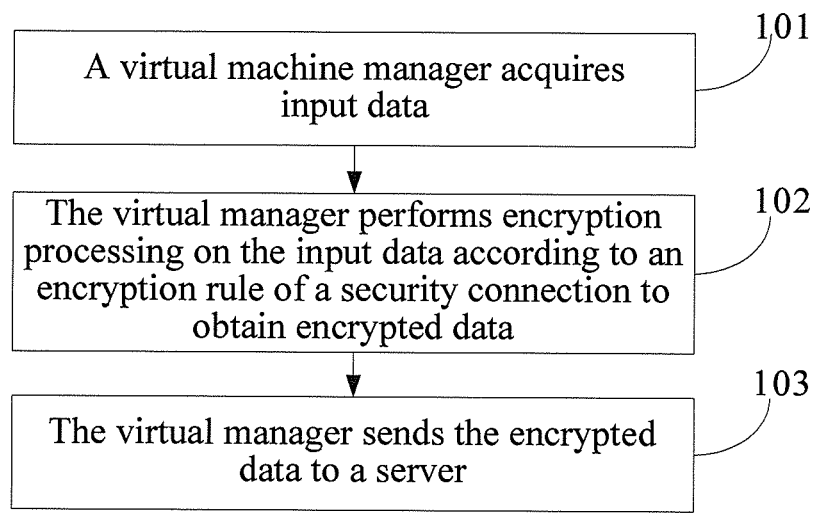
FIG. 1 is a schematic diagram of a method for inputting data according to an embodiment of the present invention.

An embodiment of the present invention provides a method for inputting data, as shown in FIG. 1, including:

101. A virtual machine manager acquires input data.

The method for the virtual machine manager to acquire the input data varies with an input device of a device.

Specifically, if the input device of the device is a virtual input unit, the method for the virtual machine manager to acquire the input data is specifically as follows: The virtual machine manager acquires the input data by using the virtual input unit.

The virtual input unit implements a same function as a physical input unit. That is, the virtual machine manager may acquire, by using the virtual input unit, data input by a user. The virtual input unit is configured to determine, according to a position tapped by the user, the data input by the user.

That is, the function of the virtual input unit created by the virtual machine manager is the same as the function of a virtual input unit on an operating system. By using the virtual input unit, data represented by different positions that are touched by the user can be acquired and then the input data can be acquired.

Further, before acquiring the input data by using the virtual input unit, the virtual machine manager may create the virtual input unit by using a virtual input unit interface provided by the operating system.

Specifically, the virtual machine manager may create a virtual input unit that is the same as the virtual input unit on the operating system by using the virtual input unit interface provided by the operating system.

It should be noted that the virtual machine manager may also create the virtual input unit by using another method, for example, the virtual machine manager itself creates the virtual input unit that is the same as the virtual input unit on the operating system without using the operating system. The method for the virtual machine manger to create the virtual input unit is not limited in the present invention.

Further, the virtual input unit includes: a virtual keyboard.

Exemplarily, if the device is a touchscreen device, the input device of the device is a virtual input unit. The virtual machine manager may create a virtual keyboard that functions the same as a virtual keyboard on the operating system. If the user inputs data on the touchscreen device, the virtual machine manager may acquire, by using the virtual keyboard, data corresponding to a position of the touchscreen device tapped by the user, thereby acquiring the input data.

Further, the virtual input unit includes a first normal zone and a first security zone, where the first normal zone is used to acquire second input data that requires no encryption processing, and the first security zone is used to acquire first input data that requires security processing.

In this case, the virtual machine manager acquires the first input data via the first security zone; and the virtual machine manager acquires the second input data via the first normal zone.

Specifically, because encryption processing needs to be performed for a part of data input by the user, the data input by the user can be differentiated. The virtual input unit may be divided into the first normal zone and the first security zone. If a position tapped by the user corresponds to the first normal zone, the virtual machine manager may acquire the second input data, does not need to perform encryption processing, and performs normal processing as it does in the prior art. If a position tapped by the user corresponds to the first security zone, the virtual machine manager may acquire the first input data and needs to encrypt the data.

Further, if a position tapped by the user is in a zone outside the virtual input unit, the virtual machine manager performs normal processing on an operation corresponding to the position tapped by the user, which is the same as an operation in the prior art. Details are not repeatedly described herein.

As described in the foregoing example, the virtual keyboard includes a control key zone, that is, the first normal zone, and a data key zone, that is, the first security zone. If a position tapped by the user is in the control key zone, the virtual machine manager may acquire corresponding control data and perform processing as it does in the prior art for the control data. For example, if the user taps the Caps Lock (Caps Lock) position in the control key zone, the virtual machine manager acquires control data Caps Lock, and in this case, the virtual machine manager performs a caps lock operation by using the operating system. If a position tapped by the user is a data key zone, the virtual machine manager may acquire corresponding data information, and in this case, the virtual machine manager uses the data information as the first input data. For example, if the user taps position A in the data key zone, the virtual machine manager captures data A input by the user and uses it as the first input data, so as to perform security processing.

It should be noted that, in this embodiment of the present invention, performing security processing on the input data refers to performing the operation in step 102 on the input data, that is, performing encryption processing on the input data.

If the input device of the device is a physical input device, the method for the virtual machine manager to acquire the input data is specifically as follows: The virtual machine manager controls a physical input unit; and the virtual machine manager acquires the input data by using the physical input unit, where the input data is buffered in an input buffer.

Further, the physical input unit includes: a physical keyboard.

Specifically, if the physical input device of the device is a physical keyboard, the virtual machine manager may control the physical keyboard, and further acquire the input data when the user performs inputting by using the physical keyboard. When the user performs inputting by using the physical keyboard, the data input by the user is buffered in the input buffer for the virtual machine manager to acquire the input data.

Further, the physical input unit includes a second security zone and a second normal zone. The second normal zone is used to acquire fourth input data that requires no security processing. The second security zone is used to acquire third input data that requires security processing.

In this case, the virtual machine manager acquires the third input data via the second security zone; and the virtual machine manager acquires the fourth input data via the second normal zone.

Specifically, because encryption processing needs to be performed for a part of data input by the user, the data input by the user can be differentiated. The physical input unit may be divided into the second normal zone and the second security zone. If the user performs inputting via the second normal zone, the virtual machine manager may acquire the fourth input data, and may perform normal processing as it does in the prior art, without a need to perform encryption processing. If the user performs inputting via the second security zone, the virtual machine manager may acquire the third input data and needs to encrypt the data.

As described in the foregoing example, the physical keyboard includes a control key zone, that is, the second normal zone, and a data key zone, that is, the second security zone. If the user performs inputting via the control zone of the physical keyboard, the virtual machine manager may acquire corresponding control data and perform processing as it does in the prior art for the control data. If the user performs inputting via the data zone of the physical keyboard, the virtual machine manager may acquire corresponding data information, and in this case, the virtual machine manager uses the data information as the third input data and performs encryption processing.

Further, after the virtual machine manager acquires the input data by controlling the physical input unit, the virtual machine manager clears the input buffer.

Specifically, after acquiring, via the input buffer, the data input by the user, the virtual machine manager needs to clear the input data stored in the input buffer, so that no other system except the virtual machine manager can acquire the input data, thereby ensuring security and reliability of the input data.

102. The virtual machine manager performs encryption processing on the input data according to an encryption rule of a security connection to obtain encrypted data.

The security connection refers to a connection that is established between an application interface and a server and used for data transmission.

It should be noted that, during the establishment of the security connection between the application interface and the server, an encryption rule may be negotiated for secure transmission over the established security connection, so that the virtual machine manager may perform the encryption according to the determined encryption rule when performing encryption processing on the acquired input data, thereby ensuring that the server can correctly parse the encrypted data when the encrypted data is transmitted to the server.

Specifically, because of the security connection established between the application interface and the server, during the encryption, the virtual machine manager needs to encrypt the input data according to the encryption rule of the security connection to obtain the encrypted data, so that the server can decrypt the data after receiving the data.

Further, if the input data acquired by the virtual machine manager in step 101 is the first input data, the virtual machine manager performs encryption processing on the first input data according to the encryption rule of the security connection to obtain the encrypted data. If the input data acquired by the virtual machine manager in step 101 is the third input data, the virtual machine manager performs encryption processing on the third input data according to the encryption rule of the security connection to obtain the encrypted data.

Optionally, the security connection includes: an SSL (Secure Sockets Layer, Secure Sockets Layer) connection. In this case, the performing encryption processing on the input data according to an encryption rule of a security connection to obtain encrypted data includes: performing encryption processing on the input data according to an encryption rule of the SSL connection to obtain the encrypted data.

That is, after the SSL connection is established between the application interface and the server, the virtual machine manager may, after acquiring the data input by the user, encrypt the input data by using a session key of the SSL connection between the application interface and the server to obtain the encrypted data.

103. The virtual machine manager sends the encrypted data to the server.

Specifically, after encrypting the input data, the virtual machine manager sends the encrypted data to the server, so that the server performs decryption according to the encryption rule of the security connection after receiving the encrypted data, thereby acquiring the data input by the user.

Further, the virtual machine manager may send the encrypted data to the server over the security connection by using the application interface.

That is, after encrypting the data input by the user to obtain the encrypted data, the virtual machine manager may send the encrypted data to the application interface, and then the application interface sends the encrypted data to the server by using the security connection.

Further, during the establishment of the SSL connection between the application interface and the server, the process of establishing the SSL connection can be implemented in two manners: a client using a certificate and a client using no certificate, where the two manners correspond to one-way authentication and two-way authentication in a handshake process for connection establishment, respectively; therefore, the establishment of the SSL connection between the application interface and the server can also be implemented in two manners: one-way authentication and two-way authentication.

Figure 2:
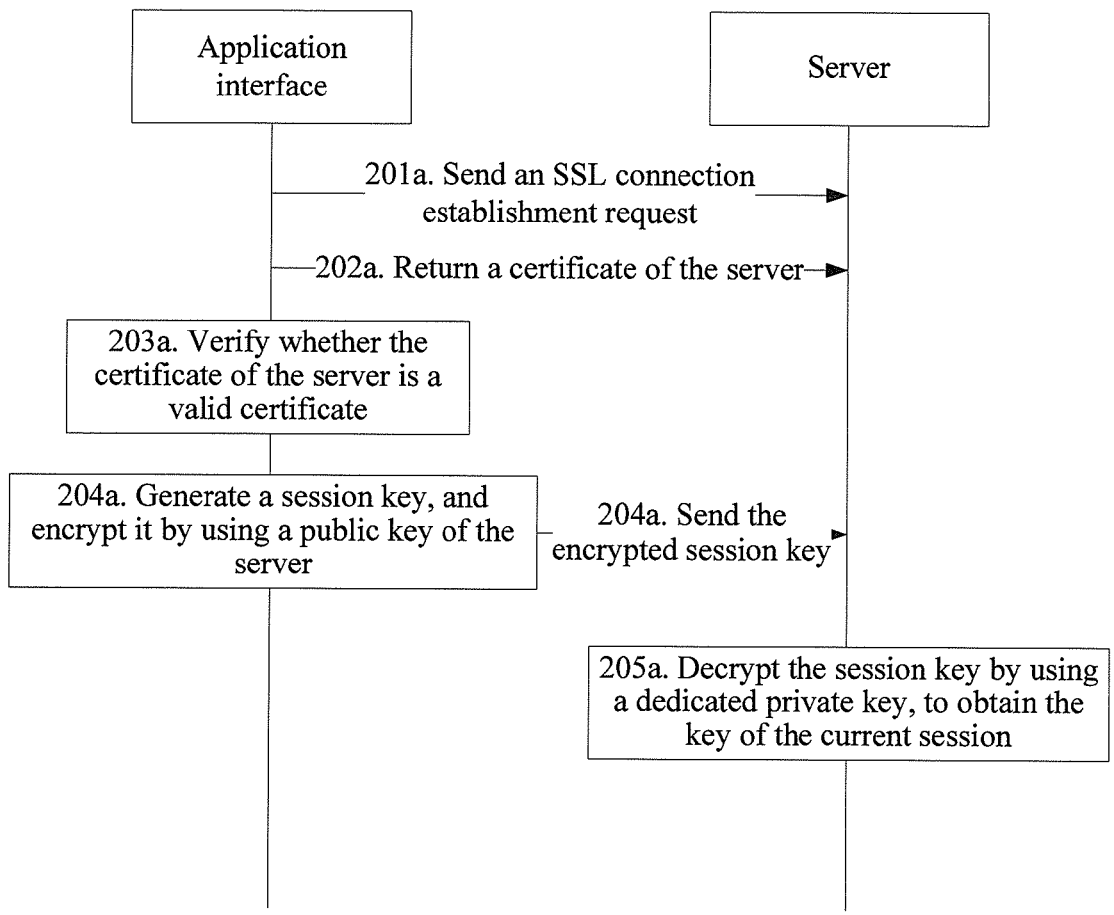
FIG. 2 is a schematic diagram of a method for establishing an SSL connection according to an embodiment of the present invention.

In a case that the SSL connection is established between the application interface and the server in the one-way authentication manner, as shown in FIG. 2, the specific process is as follows:

201a. The application interface sends an SSL connection establishment request to the server.

The SSL connection establishment request carries a version number of the SSL protocol, a type of an encryption algorithm, and other information required for communication between the application interface and the server.

202a: The server returns a certificate of the server to the application interface.

The certificate of the server includes a signature and a public key of the server certificate.

Specifically, after receiving the SSL connection establishment request sent by the application interface, the server acquires the version number of the SSL protocol of the SSL connection that is established at the request of the application interface, the type of the encryption algorithm, and other information required for communication between the application interface and the server. The server sends the certificate including its signature and public key to the application interface, so that the application interface authenticates the certificate.

203a. The application interface verifies whether the certificate of the server is a valid certificate according to the certificate returned by the server.

Specifically, after receiving the certificate returned by the server, the application interface needs to verify whether the certificate expires, whether the certificate is issued by a trusted CA (Certificate Authority, certificate authority) center, whether the public key included in the certificate can correctly decrypt the "digital signature of the issuer" of the server certificate, and whether a domain name on the certificate matches an actual domain name of the server. If it is verified that the certificate meets all the foregoing conditions, the certificate is considered a valid certificate, and the process proceeds to step 204a. If it is verified that the certificate fails to meet anyone of the foregoing conditions, the certificate is considered an invalid certificate, and the communication is interrupted.

204a. The application interface randomly generates a session key for symmetric encryption used in subsequent communication, encrypts it by using the public key of the server, and then sends the encrypted session key to the server.

Specifically, after verifying that the certificate sent by the server is a valid certificate, the application interface generates a session key for symmetric encryption, encrypts the session key by using the public key of the server acquired by using the certificate, and sends the encrypted session key to the server, so that the server acquires the session key.

205a. The server receives the session key, and decrypts it by using a dedicated private key, and then the server obtains the key of the current session.

Specifically, after receiving the encrypted session key, the server decrypts it by using a private key of the server to acquire the key of the current session, and encrypts, by using the key, data to be transmitted subsequently. In this way, both parties can use the same session key to establish a secure symmetric connection.

Figure 3:
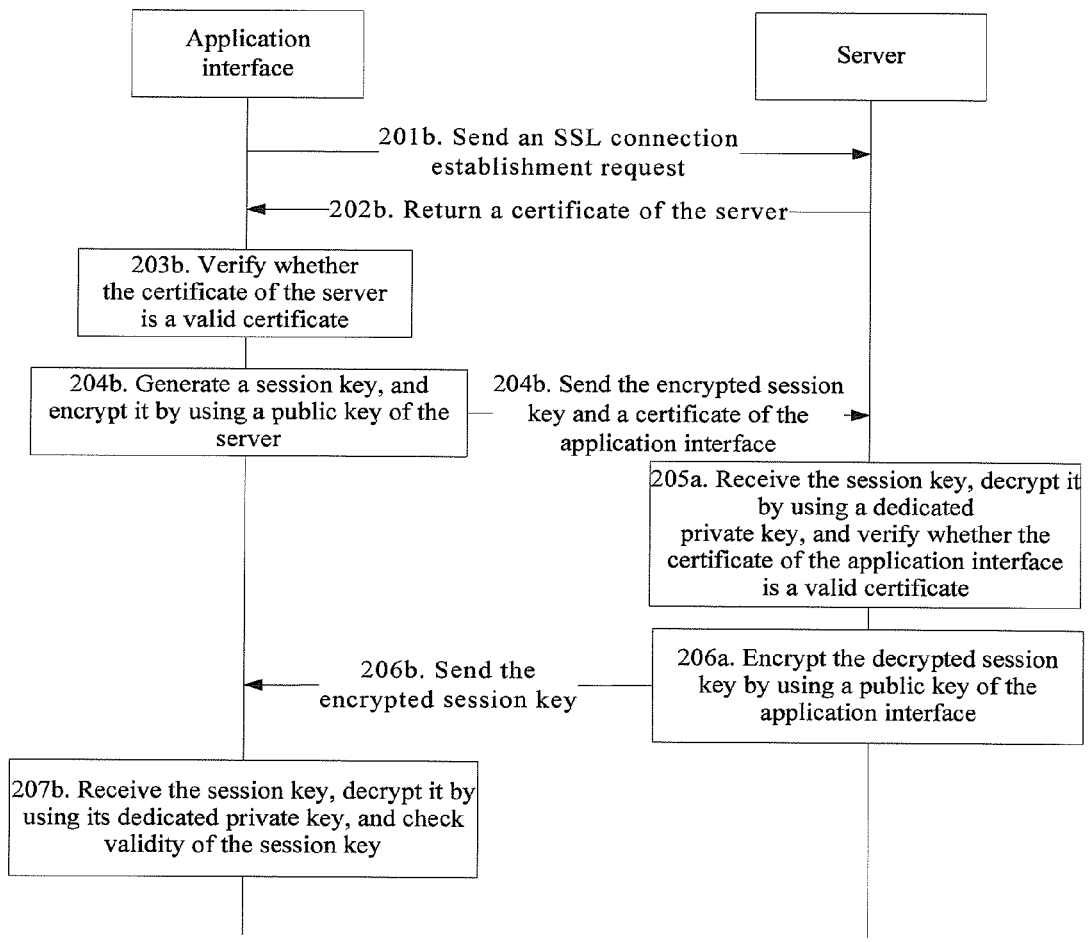
FIG. 3 is a schematic diagram of another method for establishing an SSL connection according to an embodiment of the present invention.

In a case that the SSL connection is established between the application interface and the server in the two-way authentication manner, as shown in FIG. 3, the specific process is as follows:

201b. The application interface sends an SSL connection establishment request to the server.

The SSL connection establishment request carries a version number of the SSL protocol, a type of an encryption algorithm, and other information required for communication between the application interface and the server.

202b: The server returns a certificate of the server to the application interface.

The certificate of the server includes a signature and a public key of the server certificate.

203b. The application interface verifies whether the certificate of the server is a valid certificate according to the certificate returned by the server.

Specifically, after receiving the certificate returned by the server, the application interface needs to verify whether the certificate expires, whether the certificate is issued by a trusted CA (Certificate Authority, certificate authority) center, whether the public key included in the certificate can correctly decrypt the "digital signature of the issuer" of the server certificate, and whether a domain name on the certificate matches an actual domain name of the server. If it is verified that the certificate meets all the foregoing conditions, the certificate is considered a valid certificate, and the process proceeds to step 204b. If it is verified that the certificate fails to meet any one of the foregoing conditions, the certificate is considered an invalid certificate, and the communication is interrupted.

204b. The application interface randomly generates a session key for symmetric encryption used in subsequent communication, encrypts it by using the public key of the server, and then sends the encrypted session key and a certificate of the application interface to the server.

The certificate of the application interface includes: a signature and a public key of the application interface certificate.

205b. The server receives the session key, decrypts it by using a dedicated private key, and verifies whether the certificate of the application interface is a valid certificate.

Specifically, for the verifying, by the server, whether the certificate of the application interface is a valid certificate, reference may be made to the verifying, by the application interface, whether the certificate of the server is a valid certificate, and details are not repeatedly described herein.

206b. The server encrypts the decrypted session key by using the public key of the application interface, and then sends the session key that is encrypted by using the public key of the application interface to the application interface.

Specifically, after obtaining the session key by parsing, the server encrypts the obtained session key by using the public key of the application interface, where the public key is acquired by using the certificate of the application interface, and sends the session key that is encrypted by using the public key of the application interface to the application interface, so that the application interface checks whether the session key is valid.

207b. The application interface receives the session key, decrypts it by using its dedicated private key, and checks validity of the session key.

Specifically, after receiving the encrypted session key sent by the server, the application interface decrypts it by using its private key to acquire the decrypted session key, and checks whether the decoded session key is consistent with the session key sent to the server. If they are consistent, the session key is considered to be valid, and in this case, both communication parties are authenticated, and a security connection can be established by using this same session key. If they are inconsistent, it indicates that the session key has been modified, and the connection with the server is interrupted.

It should be noted that another security connection, such as a TLS (Transport Layer Security, Transport Layer Security) connection, may also be established between the application interface and the server, which is not limited in the present invention.

It should be noted that, when the security connection between the application interface and the server is another security connection, its specific establishment method is also different and is not described herein again.

It should be noted that the process in which the virtual machine manager acquires the input data and performs encryption processing on the input data may be implemented by a module of the virtual machine manager, such as an agent, and may also be implemented by another part of the virtual machine manager, which is not limited in the present invention.

It should be noted that the virtual machine manager is a software layer, and the protection scope of the present invention covers not only the virtual machine manager but also all physical devices on which the virtual machine manager runs, that is, all devices that adopts the foregoing method for encrypting data by using the virtual machine manager shall fall within the protection scope of the present invention.

This embodiment of the present invention provides a method for inputting data. After acquiring input data, a virtual machine manager performs encryption processing on the input data according to an encryption rule of a security connection to obtain encrypted data, and sends the encrypted data to a server. In this way, encryption processing can be performed for the data input by a user on the virtual machine manager to obtain the encrypted data, and the encrypted data is then sent to the server. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

Figure 4:
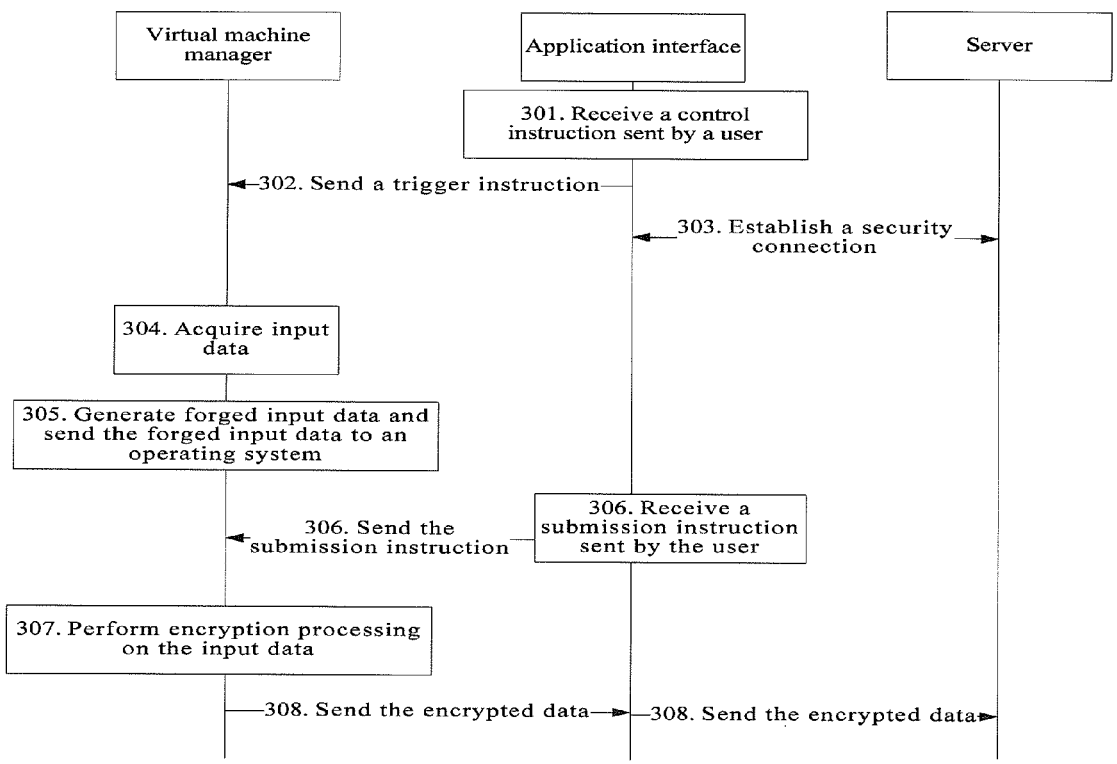
FIG. 4 is a schematic diagram of another method for inputting data according to an embodiment of the present invention.

An embodiment of the present invention provides a method for inputting data, as shown in FIG. 4, including:

301. An application interface receives a control instruction sent by a user.

Specifically, after deciding whether to enable secure input, the user may send the control instruction to the application interface so that the application interface performs corresponding processing according to the control instruction. If the control instruction instructs that secure input be disabled, the application interface notifies a virtual machine manager that secure input does not need to be performed, so that the virtual machine manager performs processing as it does in the prior art for received input data and does not need to perform encryption processing.

It should be noted that the application interface may be a plug-in of an application for which the user needs to enable secure input and is a software interface.

302. The application interface sends a trigger instruction to the virtual machine manager when the control instruction instructs that secure input be enabled. The virtual machine manager receives the trigger instruction.

The trigger instruction is an instruction that is used to trigger the virtual machine manager to enable data encryption.

Specifically, when the control instruction instructs that secure input be enabled, the application interface notifies the virtual machine manager that secure input processing needs to be performed, and therefore, the application interface triggers, by sending the trigger instruction to the virtual machine manager, the virtual machine manager to perform secure input processing. After receiving the trigger instruction, the virtual machine acquires that corresponding security processing needs to be performed for data subsequently input by the user.

It should be noted that the application interface may also trigger the virtual machine manager to perform secure input processing in another manner, which is not limited in the present invention.

303. The application interface establishes a security connection with a server.

Specifically, for the establishment of the security connection between the application interface and the server, reference may be made to the method for establishing the security connection between the application interface and the server, which is described in step 103, and details are not repeatedly described herein.

304. The virtual machine manager acquires input data.

For details, reference may be made to step 101, and details are not repeatedly described herein.

305. The virtual machine manager generates forged input data and sends the forged input data to an operating system.

Specifically, after capturing the data input by the user, to ensure normal display for an application program, the virtual machine manager generates the forged input data and sends the forged input data to the operating system, so that the operating system displays the forged input data by using the application program.

For example, after capturing data a input by the user, to ensure normal display for the application program, the virtual machine manager generates forged input data * and sends the forged input data * to the operating system, so that the operating system displays the forged input data * by using the application program.

306. The application interface receives a submission instruction sent by the user and sends the submission instruction to the virtual machine manager. The virtual machine manager receives the submission instruction.

The submission instruction is an instruction that is used to instruct a user to complete data input.

Specifically, after inputting data, the user sends the submission instruction to the application interface, and the application interface sends the submission instruction to the virtual machine manager. After receiving the submission instruction, the virtual machine manager acquires data that has been input by the user and requires security processing, that is, the virtual machine manager finishes acquiring the input data and can perform the next operation.

307. The virtual machine manager performs encryption processing on the input data according to an encryption rule of a security connection to obtain encrypted data.

After the virtual machine manager receives the trigger instruction in step 302, in this step, in response to the trigger instruction, the virtual machine manager needs to perform encryption processing on the input data according to the encryption rule of the security connection to obtain the encrypted data.

Specifically, after receiving the submission instruction, the virtual machine manager performs encryption processing on the input data according to the encryption rule of the security connection to obtain the encrypted data. For the performing, by the virtual machine manager, encryption processing on the input data according to the encryption rule of the security connection to obtain the encrypted data, reference may be made to step 102, and details are not repeatedly described herein.

308. The virtual machine manager sends the encrypted data to the server.

Specifically, the virtual machine manager may send the encrypted data to the application interface, and the application interface sends the encrypted data to the server. For details, reference may be made to step 103, and details are not repeatedly described herein.

It should be noted that, in the present invention, steps 304 to 306 may be performed after, before, or at the same time as step 303 is performed. A sequence of step 303 and steps 304 to 306 is not limited in this embodiment of the present invention. Only one situation is illustrated in the figure.

This embodiment of the present invention provides a method for inputting data. A security connection is established between an application interface and a server, and when a user needs to perform secure input, a virtual machine manager acquires input data, performs encryption processing on the input data according to an encryption rule of the security connection to obtain encrypted data, and sends the encrypted data to the server. In this way, encryption processing can be performed for the data input by the user on the virtual machine manager to obtain the encrypted data, and the encrypted data is sent to the server over the security connection by using the application interface. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

Figure 5:
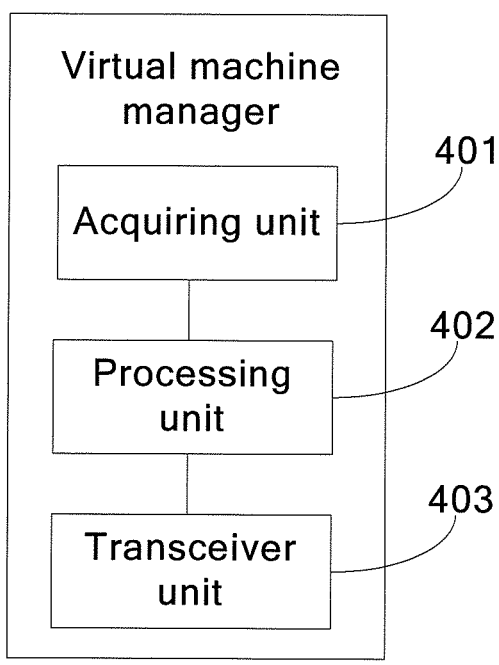
FIG. 5 is a schematic block diagram of a virtual machine manager according to an embodiment of the present invention.

FIG. 5 is a schematic functional diagram of a virtual machine manager according to an embodiment of the present invention. As shown in FIG. 5, the virtual machine manager includes an acquiring unit 401, a processing unit 402, and a transceiver unit 403.

The acquiring unit 401 is configured to acquire input data.

In this case, the acquiring unit 401 is specifically configured to acquire the input data by using a virtual input unit.

The virtual input unit implements a same function as a physical input unit. The virtual input unit is configured to determine, according to a position tapped by a user, data input by the user.

Further, the virtual input unit includes a first normal zone and a first security zone, where the first normal zone is used to acquire second input data that requires no encryption processing, and the first security zone is used to acquire first input data that requires security processing.

The acquiring unit 401 is specifically configured to acquire the first input data via the first security zone, and acquire the second input data via the first normal zone.

Optionally, the virtual input unit includes: a virtual keyboard.

Or, the acquiring unit 401 is specifically configured to control a physical input unit and acquire the input data by using the physical input unit.

The input data is buffered in an input buffer.

Further, the physical input unit includes a second security zone and a second normal zone; the second normal zone is used to acquire fourth input data that requires no security processing; and the second security zone is used to acquire third input data that requires security processing.

The acquiring unit 401 is specifically configured to acquire the third input data via the second security zone, and acquire the fourth input data via the second normal zone.

Optionally, the physical input unit includes: a physical keyboard.

The processing unit 402 is configured to perform, according to an encryption rule of a security connection, encryption processing on the input data acquired by the acquiring unit 401, to obtain encrypted data.

The security connection refers to a connection that is established between an application interface and a server and used for data transmission.

Optionally, the security connection includes: a Secure Sockets Layer SSL connection.

The processing unit 402 is specifically configured to perform encryption processing on the input data according to an encryption rule of the SSL connection to obtain the encrypted data.

Specifically, the processing unit 402 is specifically configured to, in a case that the acquiring unit 401 acquires the first input data, perform, according to the encryption rule of the security connection, encryption processing on the first input data acquired by the acquiring unit 401, to obtain the encrypted data.

Or, the processing unit 402 is specifically configured to, in a case that the acquiring unit 401 acquires the third input data, perform, according to the encryption rule of the security connection, encryption processing on the third input data acquired by the acquiring unit 401, to obtain the encrypted data.

Further, the processing unit 402 is further configured to clear the input buffer when the acquiring unit 401 is specifically configured to control the physical input unit and acquire the input data by using the physical input unit.

The transceiver unit 403 is configured to send the encrypted data to the server.

Specifically, the transceiver unit 403 is specifically configured to send the encrypted data to the server over the security connection by using the application interface.

Figure 6:
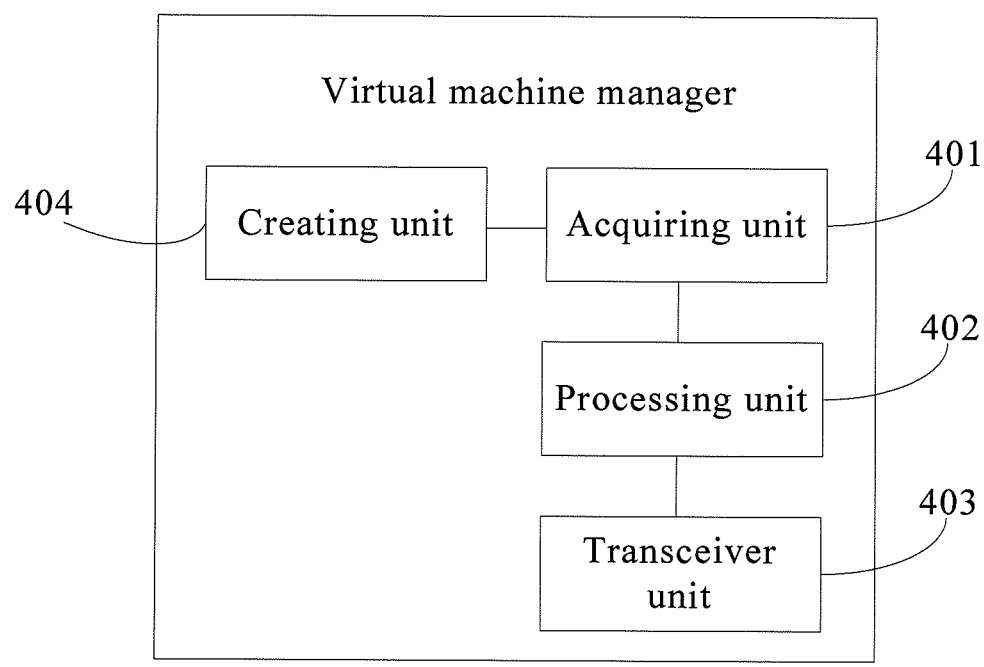
FIG. 6 is a schematic block diagram of another virtual machine manager according to an embodiment of the present invention.

Further, when the acquiring unit 401 acquires the input data by using the virtual input unit, the virtual machine manager further includes a creating unit 404, as shown in FIG. 6. The creating unit 404 is specifically configured to create a virtual input unit by using a virtual input unit interface provided by an operating system.

Further, the processing unit 402 is further configured to generate forged input data and send the forged input data to the operating system.

The transceiver unit 403 is configured to receive a submission instruction.

The submission instruction is an instruction that is used to instruct a user to complete data input.

The processing unit 402 is specifically configured to perform, after the transceiver unit 403 receives the submission instruction, encryption processing on the input data according to the encryption rule of the security connection to obtain the encrypted data.

Further, the transceiver unit 403 is further configured to receive a trigger instruction.

The trigger instruction is an instruction that is used to trigger the virtual machine manager to enable data encryption.

In this case, the processing unit 402 is specifically configured to respond to the trigger instruction received by the transceiver unit 403, and perform encryption processing on the input data according to the encryption rule of the security connection to obtain the encrypted data.

This embodiment of the present invention provides a virtual machine manager. After acquiring input data, the virtual machine manager performs encryption processing on the input data according to an encryption rule of a security connection to obtain encrypted data, and sends the encrypted data to a server. In this way, encryption processing can be performed for the data input by a user on the virtual machine manager to obtain the encrypted data, and the encrypted data is then sent to the server. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

Figure 7:
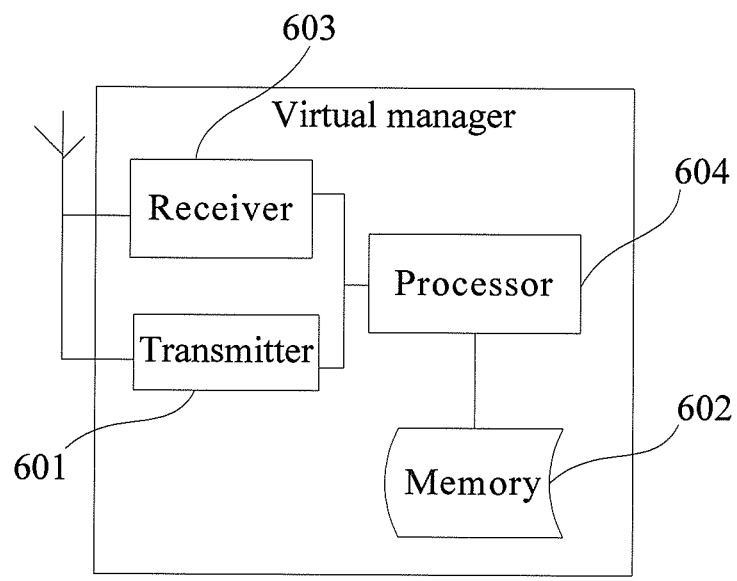
FIG. 7 is a schematic structural diagram of a virtual machine manager according to an embodiment of the present invention.

As shown in FIG. 7, it is a schematic structural diagram of a virtual machine manager according to an embodiment of the present invention. As shown in FIG. 7, the virtual machine manager includes: a transmitter 601, a memory 602, a receiver 603, and a processor 604 connected to the transmitter 601, the receiver 603, and the memory 602.

The memory 602 stores a set of program code, and the processor 604 is configured to invoke the program code in the memory 602. Specifically, the processor 604 is configured to acquire input data.

Specifically, the processor 604 is specifically configured to acquire the input data by using a virtual input unit.

The virtual input unit implements a same function as a physical input unit. The virtual input unit is configured to determine, according to a position tapped by a user, data input by the user.

Further, the virtual input unit includes a first normal zone and a first security zone, where the first normal zone is used to acquire second input data that requires no encryption processing, and the first security zone is used to acquire first input data that requires security processing.

The processor 604 is specifically configured to acquire the first input data via the first security zone, and acquire the second input data via the first normal zone.

Optionally, the virtual input unit includes: a virtual keyboard.

Further, the processor 604 is further configured to create a virtual input unit by using a virtual input unit interface provided by an operating system.

Or, the processor 604 is specifically configured to control a physical input unit, and acquire the input data by using the physical input unit.

The input data is buffered in an input buffer.

Further, the physical input unit includes a second security zone and a second normal zone; the second normal zone is used to acquire fourth input data that requires no security processing; and the second security zone is used to acquire third input data that requires security processing.

The processor 604 is specifically configured to acquire the third input data via the second security zone, and acquire the fourth input data via the second normal zone.

Optionally, the physical input unit includes: a physical keyboard.

The processor 604 is further configured to perform encryption processing on the input data according to an encryption rule of a security connection to obtain encrypted data.

The security connection refers to a connection that is established between an application interface and a server and used for data transmission.

Optionally, the security connection includes: a Secure Sockets Layer SSL connection.

The processor 604 is specifically configured to perform encryption processing on the input data according to an encryption rule of the SSL connection to obtain the encrypted data.

Specifically, the processor 604 is specifically configured to perform, in a case that the first input data has been acquired, encryption processing on the acquired first input data according to the encryption rule of the security connection to obtain the encrypted data.

Or, the processor 604 is specifically configured to perform, in a case that the third input data has been acquired, encryption processing on the acquired third input data according to the encryption rule of the security connection to obtain the encrypted data.

Further, the processor 604 is further configured to clear the input buffer when the processor 604 is specifically configured to control a physical input unit and acquire the input data by using the physical input unit.

The transmitter 601 is configured to send the encrypted data to the server.

Specifically, the transmitter 601 is specifically configured to send the encrypted data to the server over the security connection by using the application interface.

Further, the processor 604 is further configured to generate forged input data.

The transmitter 601 is further configured to send the forged input data generated by the processor 604 to the operating system.

The receiver 603 is configured to receive a submission instruction.

The submission instruction is an instruction that is used to instruct a user to complete data input.

The processor 604 is specifically configured to perform, after the receiver 603 receives the submission instruction, encryption processing on the input data according to the encryption rule of the security connection to obtain the encrypted data.

Further, the receiver 603 is further configured to receive a trigger instruction.

The trigger instruction is an instruction that is used to trigger the virtual machine manager to enable data encryption.

The processor 604 is specifically configured to respond to the trigger instruction received by the receiver 603, and perform encryption processing on the input data according to the encryption rule of the security connection to obtain the encrypted data.

This embodiment of the present invention provides a virtual machine manager. After acquiring input data, the virtual machine manager performs encryption processing on the input data according to an encryption rule of a security connection to obtain encrypted data, and sends the encrypted data to a server. In this way, encryption processing can be performed for the data input by a user on the virtual machine manager to obtain the encrypted data, and the encrypted data is then sent to the server. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

Figure 8:
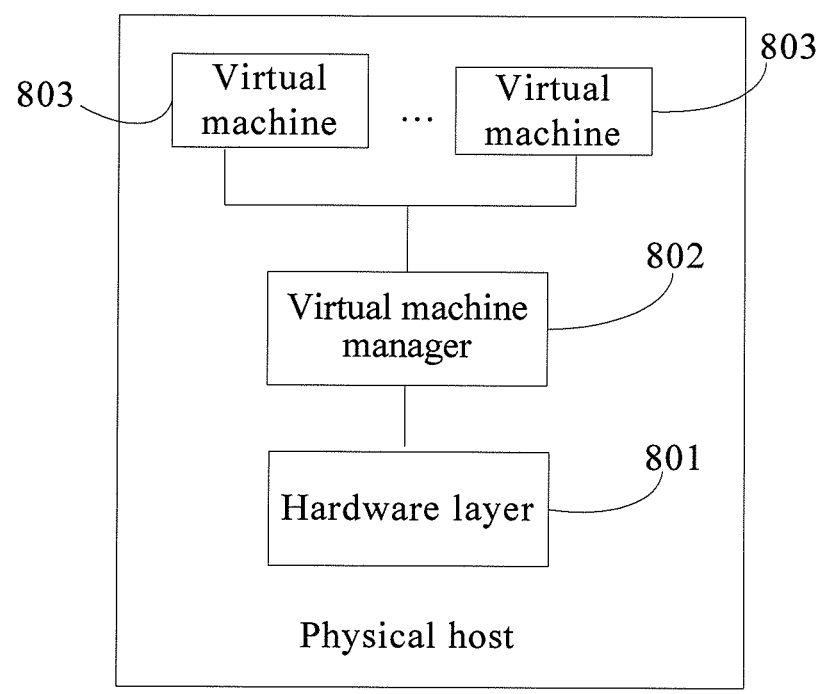
FIG. 8 is a schematic structural diagram of a physical host according to an embodiment of the present invention.

An embodiment of the present invention provides a physical host, as shown in FIG. 8, including: a hardware layer 801, a VMM (Virtual Machine Monitor/Manager, virtual machine manager) 802 running on the hardware layer 801, and at least one virtual machine 803 running on the VMM 802.

The VMM 802 is the virtual machine manager described in the foregoing embodiment.

The embodiments of the present invention provide a method and an apparatus for inputting data. A security connection is established between an application interface and a server, and when a user needs to perform secure input, a virtual machine manager acquires input data, performs encryption processing on the input data according to an encryption rule of the security connection to obtain encrypted data, and sends the encrypted data to the server. In this way, encryption processing can be performed for the data input by the user on the virtual machine manager to obtain the encrypted data, and the encrypted data is then sent to the server. It can be known that an operating system does not need to participate in the process of encrypting the data input by the user, that is, data encryption is transparent to the operating system. In this way, correct data input by the user cannot be acquired even if the operating system is attacked, thereby improving security and reliability of input information.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for inputting data, the method comprising:
acquiring, by a virtual machine manager, input data from a keyboard;
performing, by the virtual machine manager, encryption processing on the input data according to an encryption rule negotiated during the establishment of a security connection between an application interface and a server to obtain encrypted data, wherein the security connection is used for data transmission between the application interface and the server;
generating forged input data and sending the forged input data to an operating system; and
sending, by the virtual machine manager, the encrypted data to the server over the security connection.

2. The method according to claim 1, wherein acquiring, by a virtual machine manager, input data from a keyboard comprises:
acquiring, by the virtual machine manager, the input data by using a virtual keyboard, wherein the virtual keyboard implements a same function as a physical keyboard.

3. The method according to claim 2, wherein:
the virtual keyboard comprises a first normal zone and a first security zone, wherein the first normal zone is used to acquire second input data that requires no encryption processing, and the first security zone is used to acquire first input data that requires security processing;
acquiring, by the virtual machine manager, the input data by using a virtual keyboard comprises:
acquiring, by the virtual machine manager, the first input data via the first security zone; and acquiring the second input data via the first normal zone; and
performing, by the virtual machine manager, encryption processing on the input data according to an encryption rule negotiated during the establishment of the security connection between the application interface and the server to obtain encrypted data comprises:
performing, by the virtual machine manager, encryption processing on the first input data according to the encryption rule negotiated during the establishment of the security connection between the application interface and the server to obtain the encrypted data.

4. The method according to claim 1, wherein:
acquiring, by a virtual machine manager, input data from a keyboard comprises:
controlling, by the virtual machine manager, a physical keyboard; and
acquiring, by the virtual machine manager, the input data by using the physical keyboard, wherein the input data is buffered in an input buffer; and
after acquiring, by the virtual machine manager, the input data by using the physical keyboard, the method further comprises:
clearing, by the virtual machine manager, the input buffer.

5. The method according to claim 4, wherein:
the physical keyboard comprises a second security zone and a second normal zone, wherein the second normal zone is used to acquire fourth input data that requires no security processing, and the second security zone is used to acquire third input data that requires security processing;
acquiring, by the virtual machine manager, the input data by using the physical keyboard comprises:
acquiring, by the virtual machine manager, the third input data via the second security zone; and acquiring the fourth input data via the second normal zone; and
performing, by the virtual machine manager, encryption processing on the input data according to an encryption rule negotiated during the establishment of the security connection between the application interface and the server to obtain encrypted data comprises:
performing, by the virtual machine manager, encryption processing on the third input data according to the encryption rule negotiated during the establishment of the security connection between the application interface and the server to obtain the encrypted data.

6. The method according to claim 1, wherein:
before performing, by the virtual machine manager, encryption processing on the input data according to an encryption rule negotiated during the establishment of the security connection between the application interface and the server to obtain encrypted data, the method further comprises:
receiving, by the virtual machine manager, a submission instruction, wherein the submission instruction is an instruction that is used to instruct a user to complete data input; and
performing, by the virtual machine manager, encryption processing on the input data according to an encryption rule negotiated during the establishment of the security connection between the application interface and the server to obtain encrypted data comprises:
performing, by the virtual machine manager after receiving the submission instruction, encryption processing on the input data according to the encryption rule negotiated during the establishment of the security connection between the application interface and the server to obtain the encrypted data.

7. The method according to claim 1, wherein:
before acquiring, by a virtual machine manager, input data from a keyboard, the method further comprises:
receiving, by the virtual machine manager, a trigger instruction, wherein the trigger instruction is an instruction that is used to trigger the virtual machine manager to enable data encryption; and
performing, by the virtual machine manager, encryption processing on the input data according to an encryption rule negotiated during the establishment of the security connection between the application interface and the server to obtain encrypted data comprises:
performing, by the virtual machine manager and in response to the trigger instruction, encryption processing on the input data according to the encryption rule negotiated during the establishment of the security connection between the application interface and the server to obtain the encrypted data.

8. The method according to claim 1, wherein:
the security connection comprises: a Secure Sockets Layer SSL connection; and
performing, by the virtual machine manager, encryption processing on the input data according to an encryption rule negotiated during the establishment of the security connection between the application interface and the server to obtain encrypted data comprises:
performing, by the virtual machine manager, encryption processing on the input data according to an encryption rule of the SSL connection to obtain the encrypted data.

9. A physical host, comprising:
a memory and a processor;
the memory stores a set of program code and the processor is configured to invoke the program code in the memory, so as to:
acquire input data from a keyboard,
encrypt the input data according to an encryption rule negotiated during the establishment of a security connection between an application interface and a server to obtain encrypted data, wherein the security connection is used for data transmission between the application interface and the server;

generate forged input data and send the forged input data to an operating system; and
send, the encrypted data to the server over the security connection.

10. The physical host according to claim 9, wherein the processor is configured to acquire the input data by using a virtual keyboard, wherein the virtual keyboard implements a same function as a physical input unit, the virtual keyboard is configured to determine, according to a position tapped by a user, data input by the user.

11. The physical host according to claim 10, wherein:
the virtual keyboard comprises a first normal zone and a first security zone, wherein the first normal zone is used to acquire second input data that requires no encryption processing, and the first security zone is used to acquire first input data that requires security processing; and
the processor is configured to:
acquire the first input data via the first security zone, acquire the second input data via the first normal zone, and
perform encryption processing on the first input data according to the encryption rule negotiated during the establishment of the security connection between the application interface and the server to obtain the encrypted data.

12. The physical host according to claim 10, wherein:
the processor is further configured to create the virtual keyboard by using a virtual input unit interface provided by the operating system.

13. The physical host according to claim 9, wherein the processor is configured to:
acquire the input data by using a physical keyboard, wherein the input data is buffered in an input buffer; and
clear the input buffer after acquiring the input data by using the physical keyboard.

14. The physical host according to claim 13, wherein:
the physical keyboard comprises a second security zone and a second normal zone, wherein the second normal zone is used to acquire fourth input data that requires no security processing, and the second security zone is used to acquire third input data that requires security processing; and
the processor is configured to:
acquire the third input data via the second security zone;
acquire the fourth input data via the second normal zone; and
perform encryption processing on the third input data according to the encryption rule negotiated during the establishment of the security connection between the application interface and the server to obtain the encrypted data.

15. The physical host according to claim 9, wherein the processor is further configured to:
receive a trigger instruction, wherein the trigger instruction is an instruction that is used to trigger the virtual machine manager to enable data encryption; and
perform, in response to the trigger instruction, encryption processing on the input data according to the encryption rule negotiated during the establishment of the security connection between the application interface and the server to obtain the encrypted data.

16. The physical host according to claim 9, wherein:
the security connection comprises a Secure Sockets Layer SSL connection; and
the processor is configured to perform encryption processing on the input data according to an encryption rule of the SSL connection to obtain the encrypted data.

17. A physical host, comprising:
a hardware layer;
a virtual machine manager VMM running on the hardware layer; and
at least one virtual machine running on the virtual machine manager VMM, an independent operating system run on each of the virtual machines, wherein the virtual machine manager is configured to:
acquire input data from a keyboard,
encrypt the input data according to an encryption rule negotiated during the establishment of a security connection between an application interface and a server to obtain encrypted data, wherein the security connection is used for data transmission between the application interface and the server;
generate forged input data and send the forged input data to the operating system; and
send the encrypted data to the server over the security connection.

* * * * *